Sept. 6, 1932.  E. D. COOK  1,876,449

CONTROL CIRCUIT

Filed Aug. 8, 1928  3 Sheets-Sheet 1

Inventor:
Ellsworth D. Cook
by Charles E. Mullan
His Attorney.

Fig. 5.

Sept. 6, 1932.  E. D. COOK  1,876,449
CONTROL CIRCUIT
Filed Aug. 8, 1928   3 Sheets-Sheet 3

Inventor:
Ellsworth D. Cook,
by Charles V. Tullar
His Attorney.

UNITED STATES PATENT OFFICE

ELLSWORTH D. COOK, OF SCOTIA, NEW YORK, ASSIGNOR TO GENERAL ELECTRIC COMPANY, A CORPORATION OF NEW YORK

CONTROL CIRCUIT

Application filed August 8, 1928. Serial No. 298,321.

My invention relates to control circuits and it deals more particularly with certain new and useful applications of self oscillatory circuits in connection with protective circuits, control circuits, and the like.

In Patent No. 1,696,566, issued December 25, 1928, of Emmett F. Carter, filed November 25, 1924, entitled "High frequency duplex signaling system" and which is assigned to the same assignee as the present application, is disclosed an electron discharge oscillation generator the operation of which is controlled in response to a control potential which is produced by voice, or other signal, waves. This result is effected by utilizing a second electron discharge device connected in the anode circuit of the oscillation generator, the grid of the second device being normally biased negatively to a value such that insufficient anode current flows to permit the generator to produce oscillations. By applying the control potential to the grid of this second, or control electron discharge device, the anode current, and hence, the operation of the oscillation generator may be efficiently and reliably controlled.

In accordance with one aspect of my present invention a coupling between the grid circuit of a control electron discharge device, which is utilized in the manner taught by the above mentioned application, and the circuit of the oscillation generator, is provided whereby oscillations produced by the generator are supplied to the grid of the control device. Control potential is applied to the grid of the control device in the usual manner. When the control potential which is applied to the grid of the control device is of an order such that the impedance of that device is reduced sufficiently to permit anode current to flow in sufficient magnitude to permit the production of oscillations, the oscillations produced are supplied back upon the grid of the control device. This, in turn, further reduces the impedance of the control device and increases the anode current and the amplitude of the produced oscillations, this accumulative, or regenerative action continuing until the normal operating conditions of the generator are reached. Dependent upon the degree of coupling employed, as will later be explained, the oscillation generator will then continue in operation, notwithstanding that the control potential is removed from the grid of the control device, until, by suitable means provided for the purpose, its operation is interrupted.

As thus arranged the circuit has very important advantages in connection with the operation of electrical devices, such as relays, switches and the like, which will be explained hereinafter and which it is the object of my invention to provide. While my invention deals particularly with the circuit as thus arranged, and as generally applied, it has among its further purposes to provide means whereby a system of the type indicated may be applied to the operation of circuit interrupters, such as are used in power transmission lines and particularly to the automatic reclosing of such circuit interrupters when power is applied to the line and in response to line conditions.

A further purpose of the invention is to provide means whereby the oscillatory circuits provided, as indicated above, may be utilized not only in the operation of the circuit interrupter but also in producing signaling operations at a remote point indicating the condition of the switches.

The novel features which I believe to be characteristic of my invention are set forth with particularity in the appended claims. My invention itself, however, both as to its organization and method of operation, together with further objects and advantages thereof may best be understood by reference to the following description taken in connection with the accompanying drawings in which

Figure 1:
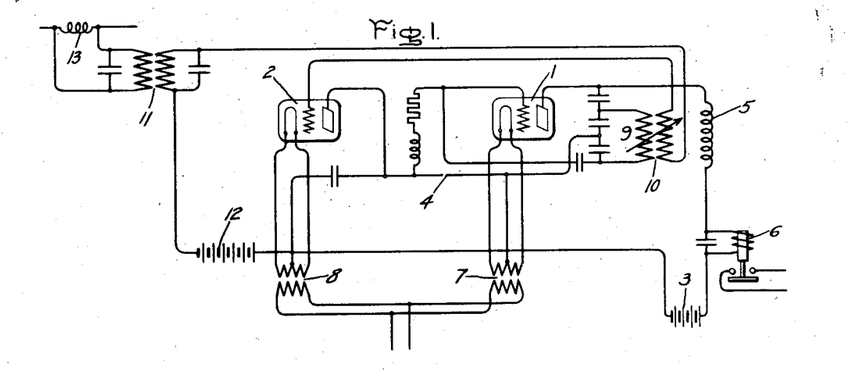
Fig. 1 represents an embodiment of my invention.

Referring to Fig. 1 of the drawings I have shown at 1 an electron discharge device of the usual three element type which is connected in any well-known manner to produce oscillations. Connected to the anode circuit of the device 1 is a second electron discharge device 2 which is also of the three element type. The anode circuit of these devices extends from the negative side of a suitable source of potential 3 through the cathode conductors of the discharge device 2, space between the cathode and anode of the device 2, conductor 4, space between the cathode and anode of the device 1, choke coil 5, actuating winding of relay 6 to the positive side of the source of potential 3. The cathodes of the discharge devices 1 and 2 are energized by means of alternating current applied to the transformers 7 and 8 respectively. Connected between the grid and anode of the discharge device 1 is the usual oscillatory circuit 9. This oscillatory circuit is coupled to the grid of the control device 2 through a circuit extending through the secondary winding of a transformer 10, the primary winding of which comprises a part of the oscillatory circuit 9, secondary winding of a transformer 11, source of biasing potential 12, to the cathode of the control device 2. The source of potential 12 is of an order such that a negative potential is impressed upon the grid of the control device sufficient to preclude the flow of current in the anode circuit, or at least sufficient to maintain this current at a value such that no oscillations are produced by the device 1.

The primary winding of the transformer 11 may be connected to any suitable source of control electromotive force. If the device is to be used in connection with the operation of overload circuit breakers this primary winding may be connected in shunt with an impedance 13 which is connected in series with the line to be protected. In such application of the system the relay 6 may be used to control the actuating winding of the circuit breaker.

As thus arranged when the potential across the impedance 13, and hence across the secondary winding of the transformer 11 increases beyond a certain value current will be caused to flow in the anode circuit of the devices 1 and 2 and oscillations will be produced by the device 1. These oscillations will be supplied through the transformer 10 to the grid of the control device 2. This in turn additionally reduces the impedance of the device 2 and further increases the flow of anode current, thereby increasing the amplitude of the oscillations produced. This accumulative or regenerative action will continue until the anode current has built up to its normal value and the oscillation generator 1 operates under normal conditions.

In the operation of my device it has been found that with a certain relatively close coupling between the windings of the transformer 10 at a certain critical value of the control potential a very slight change in voltage across the impedance 13 will cause the anode current to build up practically instantaneously to its normal value, that is, substantially square line action of this current may be had. In this manner relay 6, which may require a comparatively large current, may be reliably operated in almost instantaneous response to a very slight variation in the voltage across the impedance 13. With this coupling after the relay 6 has been operated it will be maintained in its energized condition by the regenerative connection between the oscillatory circuit 9 and the grid of the device 2.

Figure 2:
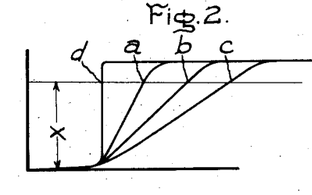
Fig. 2 represents certain operating characteristics of the circuit employed.

With a degree of coupling less than the above mentioned certain relatively close coupling, the rate of increase of anode current with respect to the increase of applied control potential will be dependent upon the degree of coupling employed. This characteristic of the device is illustrated in Fig. 2 in which curves $a$ and $b$ represent the increase in anode current when the degree of coupling is less than that above mentioned, the curve $c$ represents the static characteristics of the circuit and curve $d$ represents the increase in anode current when the degree of coupling is either equal to or greater than that above mentioned. If the lesser degree of coupling be employed the anode current will decrease when the control potential is removed and the production of oscillations will cease whereas if a coupling corresponding to curve $d$ be employed oscillations and hence the increased anode current will continue to flow notwithstanding that the control potential is removed.

Figure 3:
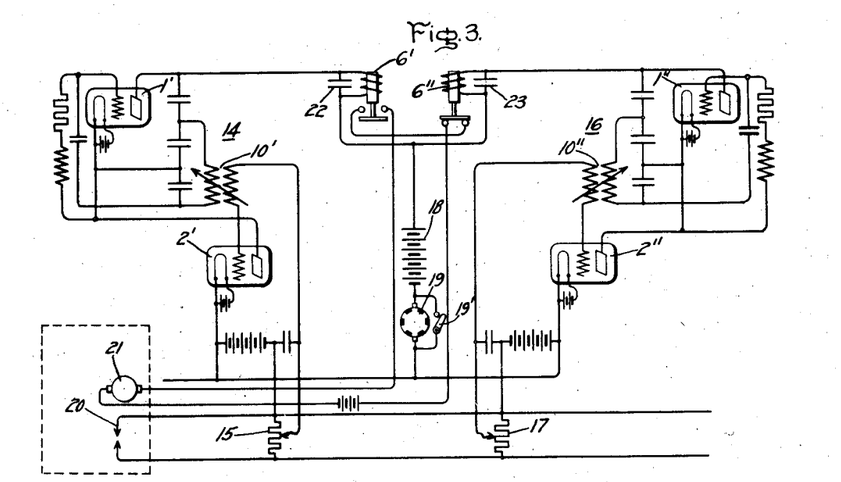
Fig. 3 represents my invention applied to a particular application.

In Fig. 3 I have shown my invention as applied to a limit switch in which an operating circuit is to be closed in response to a certain definite voltage and is to be opened in response to a different voltage. This use of my invention may be advantageous in connection with the operation of oil burning furnaces in which an electric arc is used for ignition purposes and in which it is not safe to operate the furnace when the electric arc is not in operation. This system comprises two of the devices shown in Fig. 1, one of these devices 14 deriving its control electromotive force from a resistance 15 and the other of these devices 16 deriving its control electromotive force from a resistance 17. The resistances 15 and 17 are connected in parallel across the arc 20 of the ignition system of the furnace such that the potential of the arc is applied to these resistances and a suitable portion of this potential is accordingly applied to the grid of the control device of the systems 14 and 16. The anode circuit of the oscillation generator 1' of the device 14 extends from the negative side of the source of potential 18 through a switch 19, space between the cathode and anode of control device 2', the space between the cathode and anode of the oscillation generator 1', relay 6' to the positive side of the source of potential 18. A similar circuit may be traced through corresponding elements of the device 16. The coupling between the windings of transformers 10' and 10" is greater than the critical degree of coupling mentioned above. The relays 6' and 6" of the respective devices 14 and 16 may be utilized to control the energizing circuit of the motor 21 which drives the oil pump of the furnace. The contacts of the relay 6' are normally open and the contacts of the relay 6" are normally closed. The taps on the resistances 15 and 17 are adjusted such that the relay 6' will operate at the lower limit of the voltage across the arc 20 at which it is safe to operate the furnace and such that the relay 6" will operate at the upper limit of the voltage at which the furnace may be safely operated.

As thus arranged if the potential across the arc 20 exceeds the lower limit but does not exceed the upper limit, as during proper operation of the ignition system, the relay 6' will be energized and the relay 6" will be deenergized and the circuit of the motor 21 will be complete. If the voltage drops below the lower limit for any reason, as due to carbonizing of the electrodes, sufficient control electromotive force will not be applied to the grid of the device 2' to cause the oscillation generator 1' to produce oscillations. Since the anode circuit of the devices 14 and 16 are periodically interrupted by the rotating switch 19, the relay 6' and hence the motor 21 will then become deenergized. If the electrodes of the arc 20 becomes spaced at too great a distance from each other for safe operation the potential on the resistance 17 will be increased sufficiently to trigger the device 16, thereby energizing the relay 6" and deenergizing the motor 21.

If desired the purpose of the rotating switch 19 may be accomplished by energizing the anode circuits of the different discharge devices with alternating current, that is, by replacing the battery 18 with an alternating current generator. Since the electron discharge oscillation generators 14 and 16 can operate only when the anode is at positive potential with respect to the cathodes it will be seen that the operation will be interrupted during alternate half cycles. This manner of energizing the discharge devices is employed in the arrangement shown in Fig. 6, which will later be described. The relays 6' and 6" may be retained in their closed position during the inoperative half cycle either by their inertia or by means of condensers 22 and 23 respectively, these condensers serving in the form of the device shown to maintain the relays 6' and 6" closed when the circuit is interrupted by switch 19.

Further by utilizing a degree of coupling between the windings of transformers 10' and 10" less than the relatively close coupling mentioned above the switch 19 may be dispensed with, or short circuited, as by a switch 19'. In this case the range of voltages across the arc over which the circuit of motor 21 is maintained closed may be varied to some extent by varying the coupling between these windings. This is apparent from Fig. 2. If it be assumed that the relays 6' and 6" operate upon a current of a certain value, as for example the dial X indicated in Fig. 2, it will appear that by varying the coupling the relay will be operated in response to different values of control electromotive force.

Figure 4:
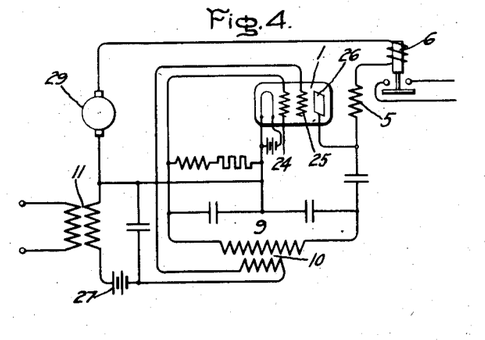
Fig. 4 represents a modifictaion.

In Fig. 4 I have shown a modification of my invention as shown in Fig. 1 in that a single electron discharge device is employed. The electron discharge device 1 in this case is of the four element type having a pair of control grids 24 and 25. Connected between the control grid 24 and the anode 26 is the oscillatory circuit 9 including the transformer 10. The secondary winding of the transformer 10 is connected in a circuit which extends from the control grid 25 through the secondary winding of the transformer 10, source of biasing potential 27, secondary winding of the transformer 11 to the cathode of the discharge device 1. The anode circuit of the device 1 extends from the anode 26, through choke coil 5, actuating winding of the relay 6 source of potential 29 and the cathode of the device 1. When suitable control potential has been applied to the grid of the discharge device 1 through the transformer 11, sufficient anode current will be caused to flow to permit the device to produce oscillations. These oscillations will be supplied through the transformer 10 back upon the control electrode 25, thereby causing the anode current quickly to build up and maintaining the anode current at a value sufficient to maintain the relay 6 in its energized condition, notwithstanding that the control potential is removed.

Figure 5:
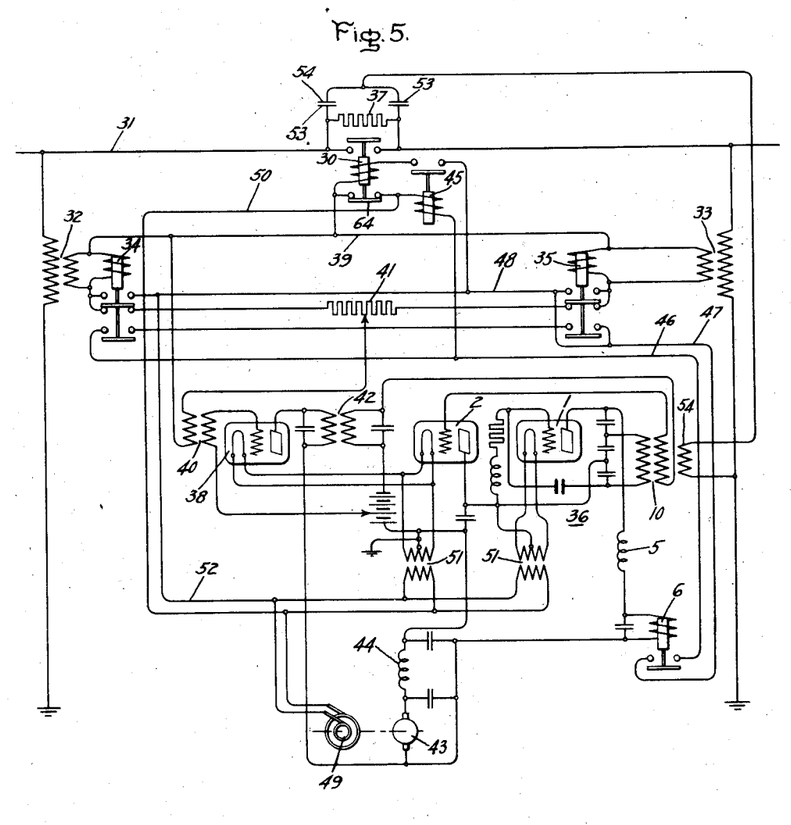
Fig. 5 represents my invention as applied to the automatic closing of circuit interrupters.

In Fig. 5 I have shown my invention as applied to the automatic reclosing of circuit breakers when power is applied to the line and in response to the conditions of the line. Since my device has the property of sensitive discrimination between potentials such as may be caused to result from varying impedance of the line it has particular utility in this connection.

Referring to Fig. 5, I have shown a circuit interrupter 30 which is included in a transmission line 31. The transmission line 31 may comprise a part of a loop circuit such as that shown in Fig. 7, which is later to be described, and has the characteristic that power may be supplied through the line in either direction. A suitable impedance 37 is connected in shunt with the contacts of the interrupter 30 so that a portion of the line potential is supplied to that part of the line on the opposite side of the interrupter from which the power is applied. Connected in shunt with the line 31, or between the line and ground, and upon opposite sides of the circuit interrupter 30, are a pair of transformers 32 and 33 which may comprise the usual distribution transformers of the system. Connected in circuit with the secondary winding of these transformers are the usual load circuits, not shown, and also the actuating windings of relays 34 and 35 respectively. These relays are arranged to control the energization and operation of the circuit 36 which is provided as indicated above for operating the circuit interrupter 30.

It is thought that this form of my invention will best be understood by reference to its operation. If it be assumed that power be supplied to the transmission line 31 at a point to the left of interrupter 30 it will be seen that full voltage will be applied to the relay 34 and that this relay will be actuated. Upon operation of this relay power will be supplied to an alternating current motor 49 through a circuit extending from the upper terminal of the secondary winding of transformer 32, through the lower contacts of interrupter 30, conductor 50, alternating current motor 49 and upper armature and upper contacts of relay 34 to the lower terminal of the secondary winding of relay 34. The alternating current motor 49 drives a direct current generator 43 to energize the anode circuits of devices 1, 2 and 38, the cathode circuits of these devices being energized through transformers 51 the primaries of which are connected in shunt with the alternating current motor 49.

The potential which appears across the secondary winding of transformer 33 will be dependent upon impedance conditions on the line 31 beyond the transformer 33 and upon the circuit which is connected to the secondary winding of the transformer. If a heavy load, such as that of a lighting circuit, is connected to the line either through transformer 33 or other transformers to the right of switch 30 this potential will be very small and will approach that which would exist if a short circuit, or other low impedance fault, had occurred on the line. In accordance with my invention the circuit 36 is operated in response to the potential of this secondary winding to close the interrupter. By utilizing a coupling between the windings 10 which is greater than the critical coupling mentioned the circuit may be made to discriminate between a low impedance fault, and the low impedance condition caused by a heavy load connected to the line notwithstanding that the impedances of the line under these conditions are but slightly different.

If a short circuit, or other low impedance fault condition exists upon the line beyond the transformer 33, or on the secondary load circuit of the transformer 33, potential which appears across the secondary winding of this transformer will not be sufficient to cause the production of oscillations and hence no further operation will result. If the impedance on the line beyond the interrupter 30, however, be but slightly greater as would be the case if a large load were connected to the line then sufficient potential will appear across the secondary winding of the transformer 33 to cause the operation of the equipment 36 and hence the closing of the circuit interrupter 30, this operation being as follows. The potential which appears across the secondary winding of the transformer 33 will be impressed upon the grid of an amplifier 38 through a circuit extending from the upper terminal of the transformer 33 through conductor 39, primary winding of transformer 40, a portion of resistance 41, upper armature and its lower contacts of relay 35 to the lower terminal of the secondary winding 33. It will be understood that this potential is not sufficiently great to cause the actuation of the relay 35. This potential is amplified by the device 38 and supplied through transformer 42 and secondary winding of transformer 10 of the discharge device 1 to the grid of control device 2, these circuits being as indicated in Fig. 1. Oscillations will be produced by the device 1 and supplied to the grid of the device 2, causing full anode current to immediately build up in the anode circuit of these devices, this circuit extends from the negative side of the source of potential 43 through smoothing reactor 44, space between the cathode and anode of the discharge device 2, space between the cathode and anode of discharge device 1, choke coil 5, relay 6 to the positive side of the source of potential 43. Relay 6 will then be energized closing a circuit which extends from the upper terminal of the secondary winding of the transformer 32 through conductor 39, lower contacts of the circuit interrupter 30, actuating winding of relay 45, conductor 46, contacts of relay 6, conductor 47, conductor 48 and upper armature and its upper contacts of relay 34, to the opposite side of the secondary winding of transformer 32. Relay 45 will then be operated closing a circuit which extends from the upper terminal of the secondary winding of the transformer 32 through the actuating winding of circuit interrupter 30, contacts of relay 45, conductor 48 and the upper armature and its upper contacts of relay 34 to the lower terminal of the secondary winding of transformer 32. Thus the actuating winding of circuit interrupter 30 will be energized and the switch will be actuated to its closed position. Upon actuation of the switch 30 to its closed position its lower contacts are open, thereby deenergizing the alternating current motor 49 and deenergizing the anode and cathode circuits of the devices 1 and 2.

After the circuit interrupter 30 has been actuated to its closed position full potential will be applied across the primary of transformer 33, thereby actuating the relay 35 to its upper position. This operation interrupts the circuit of the primary of transformer 40 at the upper armature and lower contacts of relay 35 such that the high potential of the secondary winding of transformer 33 is not impressed upon this transformer. The interrupter 30 may be retained in its closed position, and operated to its open position, by any of the usual expedients which the well-known in the art.

If we assume that the interrupter 30 is in its open position and that power is supplied from the right-hand end of the line, relay 35 will be energized and relay 34 will be in its lower position. In closing its upper contacts relay 35 completes the circuit for the motor 49, which extends from the upper terminal of the secondary winding of transformer 33 through conductor 39, lower contacts of interrupter 30, conductor 50, alternating current motor 49 and the primary winding of cathode transformers 51 in parallel, conductors 52 and 48, upper armature and its upper contact of relay 35 to the lower terminal of the secondary winding of transformer 33. The cathodes of the discharge devices will then be energized and the motor 49 will drive the direct current generator 43 to supply power to the anodes of the different discharge devices. If the impedance of the line at the left of interrupter 30 be sufficiently great potential will be applied through the upper armature and its lower contacts of relay 34, a portion of resistance 41 and transformer 40 to the grid of the amplifier 38, such that when amplified and applied to the control device 2 through transformer 42 the device 1 will produce oscillations and cause the energization of the relay 6. The interrupter will then be operated to its closed position as before thereby deenergizing the circuits of the devices 1, 2 and 38. Operation of relay 34 will then protect the transformer 40 from the high potential of the secondary winding of transformer 32.

It will be noticed that the device 1 produces oscillations until the circuit interrupter has been closed. These oscillations may, if desired, be supplied as carrier currents to the transmision line by any suitable means. As illustrated this means comprises a pair of coupling condensers 53, which are connected to the transmision line 31 on opposite sides of the interrupter 30. One terminal of each of these condensers is connected through the winding 54 which is in inductive relation with the oscillatory circuit of the oscillation generator 1 to ground. Thus during a predetermined time interval prior to the operation of the circuit breaker, high frequency oscillatory currents are supplied to the transmission line for transmisison in either direction. These currents may be received at a remote point to indicate that the circuit breaker has operated. The interval during which these currents are produced may be made as long as desired by any suitable time delay mechanism which may be associated with the relay 6, for example, to retard its operation. If for some reason, as due to an inoperative condition of the switch 30 such as might result from faulty toggle mechanism, or the like, the circuit interrupter does not close after the relay 6 has been operated, it will be seen that carrier currents will be continuously supplied to the line, thereby indicating, in a manner later to be described, that the switch is in faulty condition.

Figure 6:
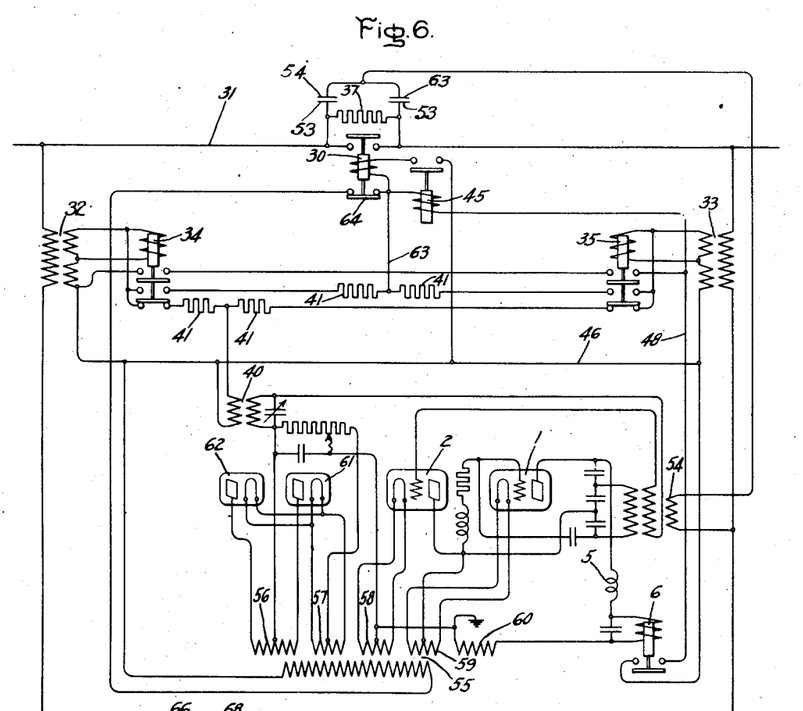
Fig. 6 represents a modification of the system shown in Fig. 5.

Figure 6 is a modification of the circuit shown in Fig. 5. In this figure it will be noted that the transformers 32 and 33 are of the double secondary type. It will further be noticed that the circuits of the electron discharge devices 1 and 2 are energized by means of alternating current which is supplied through a transformer 55 having a plurality of secondary winding 56, 57, 58, 59 and 60. The winding 56 is utilized to energize the anode circuit of two assymmetrically conducting electron discharge devices 61 and 62, which are connected to supply direct current biasing potential to the grid of the control device 2. The winding 57 supplies heating current to the cathodes of these devices. The windings 58 and 59 supply heating currents to the cathodes of the devices 2 and 1 respectively and the winding 60 supplies potential to the anode circuits of these devices. Thus the anode circuit of the devices 1 and 2 extends from the cathode conductors of the device 2 through the space between the cathode and anode of this device, cathode conductors of the device 1, space between the cathode and anode of the device 1, choke coil 5, relay 6, and winding 60 to the cathode conductors of the device 2.

The operation of this form of my invention is as follows. If it be assumed that power be received from the left-hand end of the circuit 31 and that the main contacts of the interrupter 30 are open the relay 34 will be energized. This relay will complete an energizing circuit through the lower contacts of interrupter 30 for the primary of transformer 55. Potential will be supplied, as before, through resistance 37 to the opposite end of the circuit and a portion of this potential will appear across the secondary winding of the transformer 33. This potential will be supplied through the lower contacts of relay 35 and transformer 40 to the grid of the control device 2. If the impedance conditions beyond the transformer 33 are such that the main contacts of the interrupter 30 may properly be closed this potential will be sufficiently great to cause sufficient current to flow in the anode circuits of devices 1 and 2 to cause the device 1 to produce oscillations and the relay 6 to be operated. The operation of the relay 6 completes a circuit extending from the lower terminal of the secondary winding of the transformer 32, through conductor 46, contacts of relay 6, conductor 48, actuating winding of relay 45, conductor 63, lower armature and its upper contacts of relay 34 to the upper terminal of the secondary winding of transformer 32. Relay 45 will then close its contacts, thereby energizing, through an obvious circuit, the actuating windings of the interrupter 30, causing this interrupter to close its main contacts and to open its auxiliary contacts 64, thereby interrupting the supply of energy to the transformer 55, and the operation of the oscillator 1. The interrupter 30 will then be maintained in its closed position by mechanical or other means customarily employed in connection with switches utilized for this purpose.

When power is supplied from the right-hand end of the circuit it will be apparent that the operation of devices 1 and 2 is the same except that their operation is dependent upon line conditions beyond the transformer 32.

It will be noticed that the oscillation generator of this Figure is similarly provided with an output winding 54 which is adapted to apply high frequency currents through condensers 53 to the line for transmission in either direction.

Since the anode circuit of the oscillation generator is supplied with alternating potential it operates only during the portion of the alternating current cycle during which the anode is at positive potential. Accordingly if the line impedance in the direction opposite to that from which power is supplied is such that oscillations are produced by the device 1 but this impedance is reduced, as due to trouble on the line, before sufficient time interval has elapsed to permit closing of the interrupter 30 the operation of the device 1 will be interrupted and the interrupter 30 will not be closed.

Figure 7:
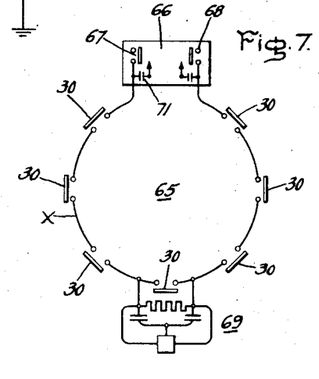
Fig. 7 represents a power transmission line of the type to which my invention may be advantageously applied and Fig. 8 represents signaling apparatus which may be utilized in connection with my invention.
Figure 8:
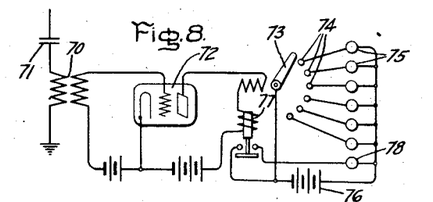

In Fig. 7 I have shown a transmission circuit in connection with which my invention has particular utility. The transmission line comprises a loop 65 extending from a power station 66. Power may be supplied to either end of the loop through interrupter 67 and 68 located at the station. Distributed about the loop are a plurality of interrupters 30, associated with each of which is apparatus 69 which may be of the type indicated in either Fig. 4 or 5. Located at the station and associated with each end of the loop 65 is a high frequency responsive circuit, such as is shown in Fig. 8. The circuit is of any well-known construction employing an electron discharge detector 72 which is connected to the line through a transformer 70 and a coupling condenser 71. Either the primary or secondary of this transformer, or both may be tuned to the frequency of oscillations produced by the generators in the different devices 69. Connected in the output circuit of the electron discharge device 72 of the receiving circuit is the actuating winding of an ordinary step by step selector switch having an armature 73 which is adapted to be actuated over a bank of contacts 74 by means of a suitable ratchet and pawl arrangement of well-known form. Each contact 74 is connected in circuit with a suitable signal lamp 75, and source of potential 76, such that when the armature 73 engages any one of these contacts a corresponding lamp 75 will be lighted. Also connected in the anode circuit of the rectifier 72 is a relay 77 which is adapted when energized to close the circuit of a signal lamp 78 for a purpose later to be indicated.

Let us assume that a fault has occurred in that section of the loop circuit 65 which is indicated by an X in the drawing and that all of the interrupters are in their open position. The operator at the station 66, desiring to ascertain in what section the fault lies will first close the switch 67 and supply power to the left-hand end of the loop circuit. Since the impedance condition between the first and second interrupters from this end of the line are proper, one interrupter 30 will be closed. Since a fault exists in the next section the next interrupter will not close with the result that only one high frequency impulse will be supplied to the receiving apparatus associated with the left-hand end of the loop at the station 66. The armature 73 of the selector switch of this apparatus will engage its first contact and cause the first one of the lamps 75 to be lighted. The operator will then close the switch 68 which is associated with the opposite end of the line. Since the impedance conditions in all of the sections to the right of the section marked X are correct four of the switches 30 will be closed and the selector which is associated with the right-hand end of the loop will engage its fourth contact, thereby energizing a corresponding lamp. The operator is then informed that the fault lies between the second and third interrupters from the left. If for any reason any of the switches 30 does not close notwithstanding that the impedance conditions in the direction opposite from that in which power is supplied is correct, then high frequency currents from the oscillation generator associated with that switch will be continuously supplied to the line causing the relay 77 to be continuously energized and the lamp 78 to be lighted. Thus for example if the operator observes that the third lamp in the bank of lamps 75 is lighted and that the lamp 78 is also continuously lighted he will know that the mechanism of the third switch from the end of the line at which power is supplied is faulty. If the lamp 78 were not lighted the operator would be informed that the difficulty lies in the line section beyond the next switch rather than in the switch itself.

If power is supplied at both ends of the loop circuit and the entire line is in good condition all of the switches will be closed. When the last switch closes, due to the fact that power is supplied at both sides of the switch, it will be seen that both of the relays 34 and 35 will be energized and will close their upper contacts. Resistances 41 prevent the occurrence of a short circuit on transformers 32 and 33. When this occurs when these relays operate the circuit of the primary winding of the transformer 40 is interrupted and the high potentials which exist upon the transformer windings 32 and 33 will be prevented from causing the circuit 36 to operate. The interrupter 30 will then be closed directly. The circuit of the actuating coil of relay 45 extending in the case shown in Fig. 5 from the upper terminal of the secondary winding of transformer 33 through auxiliary contact 64 of the switch 30, actuating winding of relay 45, lower armature and contacts of relay 34, lower armatures and contacts of relay 35, upper armature and its upper contacts of relay 35 to the lower terminal of the secondary winding of transformer 33. Relay 45 will then be operated to connect the actuating winding of the interrupter 30 in shunt with the secondary windings of transformers 32 and 33.

In the circuit shown in Fig. 6 the above operation will be accomplished as follows. The actuating winding of the relay 45 will be energized through a circuit extending from the upper terminal of transformer 33 through the lower armature and its upper contacts of relay 35, conductor 63, actuating winding of relay 45, upper armature of relay 35, upper armature of relay 34 and conductor 46 to the lower terminal of the transformer 33. Relay 45 will then be actuated to connect the actuating winding of interrupter 30 in shunt with the secondary windings of transformers 32 and 33.

The embodiments of my invention shown in Figs. 5 to 8 inclusive are disclosed and claimed in my copending application, Serial No. 578,591, filed Dec. 1, 1931, control circuits.

While I have shown particular embodiments of my invention it will, of course, be understood that I do not wish to be limited thereto since many modifications, both in the circuit arrangement and in the instrumentalities employed, may be made without departing from the spirit and scope of my invention as set forth in the appended claims.

What I claim as new and desire to secure by Letters Patent of the United States, is:

1. In a system in which a control device is operated in response to a voltage variation, and which includes a plurality of discharge paths connected in series, the method of operating said discharge paths which includes the steps of subjecting one of said paths to said voltage variation, producing oscillations by current in another path, subjecting said first path to the oscillations produced, and controlling said device by current flowing through said discharge paths in series.

2. In a system in which a control device is operated in response to a voltage variation and which includes a plurality of series connected discharge paths, the method of operating said discharge paths comprising the steps of diminishing the impedance of one of said paths in response to said voltage variation thereby to increase the current in the circuit, producing electrical oscillations in response to said increase in current in the other path, supplying said electrical oscillations to the first path and operating said device in response to the current in said circuit.

3. In combination, a pair of series connected electron discharge devices, the discharge paths of said devices being connected in series, means for causing one of said devices to produce electric oscillations, means for supplying said oscillations to the other device to increase the current flowing therein, and means connected to respond to the current flowing through said paths in series.

4. In combination, an electrical circuit including a pair of series connected discharge paths, means for controlling one of said discharge paths, means for causing electrical oscillations to be produced responsively to current in the other discharge path, means for controlling the impedance of said first discharge path responsively to said oscillations and means connected to respond to current in said circuit.

5. In combination, a relay, means for operating said relay comprising an electron discharge oscillation generator, the discharge path of said generator being connected in series with said relay, a second electron discharge device connected in series with said relay having a control element, means for supplying electromotive force to said control element to cause said generator to operate, and means for supplying oscillations produced by said generator to said control element thereby to control the flow of current through said relay.

6. In combination, an electron discharge oscillation generator having an oscillatory circuit, an electron discharge device having an anode, a cathode and a grid, said anode and cathode being connected in series with the anode circuit of said oscillation generator, means for supplying control electromotive force to said grid to control the operation of said oscillation generator, a variable coupling between said oscillatory circuit and said grid whereby oscillations produced by said generator are supplied to said grid, and a device to be controlled connected to respond to current flowing in said anode circuit.

In witness whereof, I have hereunto set my hand this 7th day of August, 1928.

ELLSWORTH D. COOK.